(12) United States Patent
Gore et al.

(10) Patent No.: US 8,190,455 B2
(45) Date of Patent: May 29, 2012

(54) MANAGING AN INSURANCE PLAN

(75) Inventors: Adrian Gore, Houghton Estate (ZA); Herschel Phillip Mayers, Johannesburg (ZA); Kenneth Steven Rabson, Johannesburg (ZA)

(73) Assignee: Discovery Holdings Limited, Sandton (ZA)

( * ) Notice: Subject to any disclaimer, the term of this patent is extended or adjusted under 35 U.S.C. 154(b) by 260 days.

(21) Appl. No.: 12/477,208

(22) Filed: Jun. 3, 2009

(65) Prior Publication Data

US 2009/0299775 A1    Dec. 3, 2009

(30) Foreign Application Priority Data

Jun. 3, 2008  (ZA) .................................. 2008/04807

(51) Int. Cl.
  *G06Q 10/00* (2012.01)
  *G06Q 50/00* (2012.01)
  *G06Q 40/00* (2012.01)
(52) U.S. Cl. .................................. 705/4; 705/2; 705/3
(58) Field of Classification Search .................. 705/2, 3
  See application file for complete search history.

(56) References Cited

U.S. PATENT DOCUMENTS

| | | |
|---|---|---|
| 4,556,216 A | 12/1985 | Ptikanen |
| 4,699,375 A | 10/1987 | Appelbaum et al. |
| 4,831,526 A | 5/1989 | Luchs et al. |
| 4,837,693 A | 6/1989 | Schotz |
| 4,860,275 A | 8/1989 | Kakinuma et al. |
| 4,975,840 A | 12/1990 | DeTore et al. |
| 5,062,645 A | 11/1991 | Goodman et al. |
| 5,136,502 A | 8/1992 | Van Remortel et al. |
| 5,297,026 A | 3/1994 | Hoffman |
| 5,301,105 A | 4/1994 | Cummings, Jr. |
| 5,324,077 A | 6/1994 | Kessler et al. |
| 5,429,506 A | 7/1995 | Brophy et al. |
| 5,490,260 A | 2/1996 | Miller et al. |
| 5,542,420 A | 8/1996 | Goldman et al. |
| 5,549,117 A | 8/1996 | Tacklind et al. |
| 5,550,734 A | 8/1996 | Tarter et al. |
| 5,574,803 A | 11/1996 | Gaborski et al. |

(Continued)

FOREIGN PATENT DOCUMENTS

AU    2001/276596    3/2003

(Continued)

OTHER PUBLICATIONS

Gore, Adrian "The case for consumer engagement in the funding of healthcare" IAAHS 2007.*

(Continued)

*Primary Examiner* — Neal Sereboff
(74) *Attorney, Agent, or Firm* — Fleit Gibbons Gutman Bongini & Bianco, PL; Paul D. Bianco; Gary S. Winer

(57) ABSTRACT

A system for managing an insurance scheme, the system including a benefit module to define at least one insured event for an insured person and to define at least one benefit to be paid out on the occurrence of one of the insured events. A monitoring module monitors the compliance of the insured person with a wellness program. A calculation module alters the at least one benefit based on the degree of participation of the insured person with the wellness programme and an awards module, on the occurrence of the at least one insured event, provides the at least one altered benefit to the insured person.

19 Claims, 3 Drawing Sheets

U.S. PATENT DOCUMENTS

| | | | |
|---|---|---|---|
| 5,630,073 | A | 5/1997 | Nolan |
| 5,631,828 | A | 5/1997 | Hagan |
| 5,655,085 | A | 8/1997 | Ryan et al. |
| 5,655,997 | A | 8/1997 | Greenberg et al. |
| 5,692,501 | A | 12/1997 | Minturn |
| 5,722,418 | A | 3/1998 | Bro |
| 5,745,893 | A | 4/1998 | Hill et al. |
| 5,752,236 | A | 5/1998 | Sexton et al. |
| 5,774,883 | A | 6/1998 | Andersen et al. |
| 5,832,467 | A | 11/1998 | Wavish |
| 5,867,821 | A | 2/1999 | Ballantyne et al. |
| 5,890,129 | A | 3/1999 | Spurgeon |
| 5,933,809 | A | 8/1999 | Hunt et al. |
| 5,933,815 | A | 8/1999 | Golden |
| 5,937,387 | A | 8/1999 | Summerell et al. |
| 5,956,691 | A | 9/1999 | Powers |
| 5,987,434 | A | 11/1999 | Libman |
| 5,991,744 | A | 11/1999 | DiCresce |
| 6,039,688 | A | 3/2000 | Douglas et al. |
| 6,049,772 | A | 4/2000 | Payne et al. |
| 6,085,174 | A | 7/2000 | Edelman |
| 6,085,976 | A | 7/2000 | Sehr |
| 6,108,641 | A | 8/2000 | Kenna et al. |
| 6,112,986 | A | 9/2000 | Berger et al. |
| 6,151,586 | A | 11/2000 | Brown |
| 6,169,770 | B1 | 1/2001 | Gamble et al. |
| 6,230,142 | B1 | 5/2001 | Benigno et al. |
| 6,338,042 | B1 | 1/2002 | Paizis |
| 6,385,589 | B1 | 5/2002 | Trusheim et al. |
| 6,513,532 | B2 | 2/2003 | Mault et al. |
| 6,587,829 | B1 | 7/2003 | Camarda et al. |
| 6,602,469 | B1 | 8/2003 | Maus et al. |
| 6,611,815 | B1 | 8/2003 | Lewis et al. |
| 6,965,868 | B1 | 11/2005 | Bednarek |
| 7,319,970 | B1 | 1/2008 | Simone |
| 7,380,707 | B1 | 6/2008 | Fredman |
| 7,383,223 | B1 | 6/2008 | Dilip et al. |
| 7,398,217 | B2 * | 7/2008 | Lewis et al. ............... 705/2 |
| 7,624,032 | B2 | 11/2009 | Rabson |
| 7,630,937 | B1 | 12/2009 | Mo et al. |
| 7,685,007 | B1 | 3/2010 | Jacobson |
| 7,797,175 | B2 | 9/2010 | Luedtke |
| 2001/0037214 | A1 | 11/2001 | Raskin et al. |
| 2001/0053984 | A1 | 12/2001 | Joyce |
| 2002/0002495 | A1 | 1/2002 | Ullman |
| 2002/0013717 | A1 | 1/2002 | Ando et al. |
| 2002/0016923 | A1 | 2/2002 | Knaus |
| 2002/0029158 | A1 | 3/2002 | Wolff et al. |
| 2002/0035486 | A1 | 3/2002 | Huyn et al. |
| 2002/0038310 | A1 | 3/2002 | Reitberg |
| 2002/0042763 | A1 | 4/2002 | Pillay |
| 2002/0049617 | A1 | 4/2002 | Lencki et al. |
| 2002/0055859 | A1 | 5/2002 | Goodman et al. |
| 2002/0087364 | A1 | 7/2002 | Lerner et al. |
| 2002/0103678 | A1 | 8/2002 | Burkhalter et al. |
| 2002/0111827 | A1 | 8/2002 | Levin et al. |
| 2002/0116231 | A1 | 8/2002 | Hele et al. |
| 2002/0138309 | A1 | 9/2002 | Thomas |
| 2002/0152097 | A1 | 10/2002 | Javors |
| 2002/0184129 | A1 | 12/2002 | Arena |
| 2003/0009355 | A1 | 1/2003 | Gupta |
| 2003/0028483 | A1 | 2/2003 | Sanders et al. |
| 2003/0055767 | A1 | 3/2003 | Tamura |
| 2003/0065561 | A1 | 4/2003 | Brown |
| 2003/0120521 | A1 | 6/2003 | Sherman |
| 2003/0120570 | A1 | 6/2003 | Dellinger |
| 2003/0135391 | A1 | 7/2003 | Edmundson |
| 2003/0149596 | A1 | 8/2003 | Bost |
| 2003/0194071 | A1 | 10/2003 | Ramian |
| 2003/0200101 | A1 | 10/2003 | Adler |
| 2003/0200142 | A1 | 10/2003 | Hicks et al. |
| 2003/0208385 | A1 | 11/2003 | Zander |
| 2003/0212579 | A1 | 11/2003 | Brown |
| 2003/0233278 | A1 * | 12/2003 | Marshall .................. 705/14 |
| 2004/0030625 | A1 | 2/2004 | Radson et al. |
| 2004/0039608 | A1 | 2/2004 | Mazur |
| 2004/0059608 | A1 | 3/2004 | Gore et al. |
| 2004/0088219 | A1 | 5/2004 | Sanders et al. |
| 2004/0138928 | A1 | 7/2004 | Monk |
| 2004/0267570 | A1 | 12/2004 | Becker et al. |
| 2005/0010453 | A1 | 1/2005 | Terlizzi |
| 2005/0033609 | A1 | 2/2005 | Yang |
| 2005/0038679 | A1 | 2/2005 | Short |
| 2005/0060209 | A1 | 3/2005 | Hill |
| 2005/0071205 | A1 | 3/2005 | Terlizzi |
| 2005/0102172 | A1 | 5/2005 | Sirmans, Jr. |
| 2005/0131742 | A1 | 6/2005 | Hoffman et al. |
| 2005/0222867 | A1 | 10/2005 | Underwood |
| 2005/0222877 | A1 | 10/2005 | Radson et al. |
| 2005/0222878 | A1 | 10/2005 | Radson et al. |
| 2005/0228692 | A1 * | 10/2005 | Hodgdon .................. 705/2 |
| 2005/0234742 | A1 | 10/2005 | Hodgdon |
| 2005/0240449 | A1 | 10/2005 | Rabson et al. |
| 2005/0256748 | A1 | 11/2005 | Gore et al. |
| 2005/0288971 | A1 | 12/2005 | Cassandra |
| 2006/0041454 | A1 | 2/2006 | Matisonn et al. |
| 2006/0064320 | A1 | 3/2006 | Postrel |
| 2006/0074801 | A1 | 4/2006 | Pollard et al. |
| 2006/0111944 | A1 * | 5/2006 | Sirmans et al. .............. 705/3 |
| 2006/0129436 | A1 | 6/2006 | Short |
| 2006/0143055 | A1 | 6/2006 | Loy |
| 2006/0218011 | A1 * | 9/2006 | Walker et al. .............. 705/3 |
| 2006/0218023 | A1 | 9/2006 | Conrad |
| 2007/0050215 | A1 | 3/2007 | Kil |
| 2007/0050217 | A1 | 3/2007 | Holden, Jr. |
| 2007/0061237 | A1 | 3/2007 | Merton |
| 2007/0094125 | A1 | 4/2007 | Izyayev |
| 2007/0112669 | A1 | 5/2007 | Snyder |
| 2007/0136093 | A1 | 6/2007 | Rankin |
| 2007/0233512 | A1 | 10/2007 | Gore |
| 2008/0033751 | A1 * | 2/2008 | Greene .................. 705/2 |
| 2008/0046382 | A1 | 2/2008 | Metz |
| 2008/0071600 | A1 | 3/2008 | Johnson |
| 2008/0154650 | A1 | 6/2008 | Matisonn et al. |
| 2008/0172214 | A1 | 7/2008 | Col |
| 2008/0189141 | A1 | 8/2008 | Gore et al. |
| 2008/0197185 | A1 | 8/2008 | Cronin et al. |
| 2008/0255979 | A1 | 10/2008 | Slutzky et al. |
| 2008/0262877 | A1 | 10/2008 | Hargroder |
| 2008/0312969 | A1 | 12/2008 | Raines |
| 2009/0024478 | A1 | 1/2009 | Dixon |
| 2009/0076903 | A1 | 3/2009 | Schwarzberg et al. |
| 2009/0105550 | A1 | 4/2009 | Rothman |
| 2009/0150189 | A1 | 6/2009 | Barron |
| 2009/0150192 | A1 | 6/2009 | Gore et al. |
| 2009/0198525 | A1 | 8/2009 | Gore et al. |
| 2009/0204441 | A1 | 8/2009 | Read |
| 2009/0204446 | A1 | 8/2009 | Simon |
| 2009/0240532 | A1 | 9/2009 | Gore et al. |
| 2009/0259497 | A1 | 10/2009 | Gore et al. |
| 2009/0265183 | A1 | 10/2009 | Pollard et al. |
| 2009/0299773 | A1 | 12/2009 | Gore et al. |
| 2009/0299774 | A1 | 12/2009 | Gore et al. |
| 2009/0299775 | A1 | 12/2009 | Gore et al. |
| 2009/0299776 | A1 | 12/2009 | Gore et al. |
| 2009/0307015 | A1 | 12/2009 | Gore et al. |
| 2010/0023354 | A1 | 1/2010 | Gore et al. |
| 2010/0023384 | A1 | 1/2010 | Pollard et al. |
| 2010/0049541 | A1 | 2/2010 | Pollard et al. |

FOREIGN PATENT DOCUMENTS

| | | |
|---|---|---|
| AU | 2005/323847 | 2/2007 |
| AU | 2007/257457 | 1/2009 |
| AU | 2007/257458 | 1/2009 |
| AU | 2007/257546 | 1/2009 |
| AU | 2007/298514 | 2/2009 |
| AU | 2007/301521 | 5/2009 |
| CN | 2005/880047059 | 7/2007 |
| EP | 1050821 | 11/2008 |
| IL | 195735 | 12/2008 |
| IL | 195737 | 12/2008 |
| IL | 195738 | 12/2008 |
| WO | 02/47074 | 6/2002 |
| WO | 03/007230 | 1/2003 |
| WO | 2007/141695 | 12/2007 |
| WO | 2007/141696 | 12/2007 |
| WO | 2007/141968 | 12/2007 |

| | | |
|---|---|---|
| WO | 2008/035280 | 3/2008 |
| ZA | 98/02005 | 3/1998 |
| ZA | 98/11943 | 12/1998 |
| ZA | 2000/04682 | 9/2000 |
| ZA | 2004/02587 | 4/2004 |
| ZA | 2004/02891 | 4/2004 |
| ZA | 2004/05935 | 7/2004 |
| ZA | 2004/06294 | 8/2004 |
| ZA | 2006/01934 | 3/2006 |
| ZA | 2006/04673 | 6/2006 |
| ZA | 2006/04674 | 6/2006 |
| ZA | 2006/04687 | 6/2006 |
| ZA | 2006/04688 | 6/2006 |
| ZA | 2006/07789 | 9/2006 |
| ZA | 2006/07992 | 9/2006 |
| ZA | 2008-003529 | 4/2008 |
| ZA | 2008/04807 | 6/2008 |
| ZA | 2008/04808 | 6/2008 |
| ZA | 2008/04809 | 6/2008 |
| ZA | 2008/04810 | 6/2008 |
| ZA | 2008/04811 | 6/2008 |
| ZA | 2009/01740 | 3/2009 |

OTHER PUBLICATIONS

Preferred Health Systems "Preferred News" vol. 9, issue 1, Spring 2008.*
Discovery, "Why Discovery Life" May 29, 2008.*
BM Link, "Your Company Websites—Discovery Life Plans" Nov. 13, 2003.*
Destiny Health, "Individual Brochure—Health Coverage" modified Oct. 18, 2006.*
DaSilva, Roseanne "The Impact of Wellness Activities on Hospital Claims Experience" Joint Colloquium of the IACA, PPSS and IAAHS May 2008.*
Discovery Life "The Discovery life Portfolio", 62 pgs—2008.
AFLAC "Personal Disability Income Protector", 6 pgs—Jul. 2003.
R.C. Olmstead, "Our Products" May 2008.
Discovery Life—"Why Discovery Life"—4 pgs—May 29, 2008.
GE Group Life Assurance Company—Group Short Term Disability Insurance—18 pgs, Oct. 29, 2004.
Wenfin Financial Services, "Discovery Life Plan" www.bmlink.co.za/WenFininsurance—Website download, 58 pgs, Aug. 5, 2011.
EconEdLink—"How Long is Your life?"—Tutorial from EconEdLink.com web-site, 4 pgs, posted Sep. 13, 2004.
AFLAC—"Personal Cancer Indemnity Plan" Level 3, 11 pgs, Jun. 2005.
Gendell Murray, "Retirement age Declines again in 1990s", Monthly Labor Review, 10 pgs, Oct. 2001.
Discovery Life "Benefit version Reference Guide" Oct. 2008.
Discovery Life—"Discovery life Group Risk Life Plan".
WenfinWebPages for Discovery Life Nov. 13, 2006.
AFLAC—Discovery Life "Application for Discovery Card Protector" Nov. 2007.
Discovery Life "The Disovery Life Portfolio" Nov. 20, 2008.
Discovery Life "Discovery Individual LIE Plan Guide" Aug. 4, 2009
EconEdLink—How Long is Your life?—Tutorial from EconEdLink.com web-site, posted Sep. 13, 2004.
Discovery Life "The Discovery Life Portfolio" Jun. 2008.
Discovery Invest Group Retirement {Plan Financial Solutions for employees: Oct. 17, 2009.
ATG Customer Success Story: Discovery Heathly 2006 ART Tech Group, Inc.
Discovery Vitality; Discovery Vitality 2009 Sep. 12, 2008.
Discovery Invest, Group Retirement Plan Finanical solutions for employees Jan. 17, 2009.
Baker et al. Pay for Performance Incentive Programs in Healthcare; Market Dynammics and Business Process-Research Report 2003.
PruHealth, Individual Policy Document Jul. 2008.
Discovery Vitality, Lesson Plans Grade 4 and 5 Apr. 2, 2008.
HLC Financial Services, Discovery News Feb. 2009.
The Discovery Life, "Technical guide for financial advisers" Nov. 2008.
International Search Report for PCT/IB05/003842 filed Dec. 21, 2005 (WO2006/072822).
Written Opinion for PCT/IB05/003842 filed Dec. 21, 2005 (WO2006/072822).
International Preliminary Report on Patentability for PCT/IB05/003842 filed Dec. 21, 2005 (WO2006/072822).
International Search Report for PCT/IB07/051945 filed May 23, 2007 (WO2007/141695).
Written Opinion for PCT/IB07/051945 filed May 23, 2007 (WO2007/141695).
International Preliminary Report on Patentability for PCT/IB07/051945 filed May 23, 2007 (WO2007/141695).
International Search Report for PCT/IB07/051946 filed May 23, 2007 (WO2007/141696).
Written Opinion for PCT/IB07/051946 filed May 23, 2007 (WO2007/141696).
International Preliminary Report on Patentability for PCT/IB07/051946 filed May 23, 2007 (WO2007/141696).
International Search Report for PCT/IB07/051947 filed May 23, 2007 (WO2007/141697).
Written Opinion for PCT/IB07/051947 filed May 23, 2007 (WO2007/141697).
International Preliminary Report on Patentability for PCT/IB07/051947 filed May 23, 2007 (WO2007/141697).
International Search Report published Apr. 23, 2009 for PCT/IB07/051948 filed May 23, 2007 (WO2007/141698).
Written Opinion published Mar. 13, 2009 PCT/IB07/051948 filed May 23, 2007 (WO2007/141698).
International Preliminary Report on Patentability published Mar. 17, 2009 for PCT/IB07/051948 filed May 23, 2007 (WO2007/141698).
International Search Report for PCT/IB07/053906 filed Sep. 26, 2007 (WO2008/038232).
Written Opinion for PCT/IB07/053906 filed Sep. 26, 2007 (WO2008/038232).
International Preliminary Report on Patentability for PCT/IB07/053906 filed Sep. 26, 2007 (WO2008/038232).
International Search Report for PCT/IB01/01406 filed Aug. 8, 2001 (WO2002/013438).
International Preliminary Report on Patentability for PCT/IB01/01406 filed Aug. 8, 2001 (WO2002/013438).
International Search Report for PCT/IB2007/053760 filed Sep. 18, 2007 (WO2008/035280).
Written Opinion for PCT/IB2007/053760 filed Sep. 18, 2007 (WO2008/035280).
International Preliminary Report on Patentability for PCT/IB2007/053760 filed Sep. 18, 2007 (WO2008/035280).
U.S. Appl. No. 09/876,311, filed Jun. 7, 2001.
U.S. Appl. No. 09/876,311, Final Rejection Oct. 23, 2006.
U.S. Appl. No. 09/876,311, Final Rejection Dec. 16, 2009.
U.S. Appl. No. 09/876,311, Non-Final Rejection Jan. 17, 2006.
U.S. Appl. No. 09/876,311, Non-Final Rejection Nov. 30, 2007.
U.S. Appl. No. 09/876,311, Non-Final Rejection Jul. 9, 2010.
U.S. Appl. No. 09/876,311, Requirement for Restriction May 18, 2007.
U.S. Appl. No. 09/876,311, Requirement for Restriction Jan. 2, 2009.
U.S. Appl. No. 09/876,311, Requirement for Restriction Jan. 16, 2009.
U.S. Appl. No. 09/876,311, Requirement for Restriction Aug. 10, 2009.
U.S. Appl. No. 09/876,311, Response to Office Action Jul. 19, 2006.
U.S. Appl. No. 09/876,311, Response to Office Action Feb. 23, 2007.
U.S. Appl. No. 09/876,311, Response to Office Action Jul. 17, 2007.
U.S. Appl. No. 09/876,311, Response to Office Action May 29, 2008.
U.S. Appl. No. 09/876,311, Response to Office Action Oct. 15, 2008.
U.S. Appl. No. 12/477,225, Non-final Office Action Mar. 25, 2011.
U.S. Appl. No. 12/122,549, Non-final Office Action Mar. 30, 2011.
U.S. Appl. No. 12/33,465, Non-final Office Action Mar. 30, 2011.
U.S. Appl. No. 11/189,647, Response to Office Action Apr. 18, 2011.
U.S. Appl. No. 12/303,395, Non-Final Rejection Apr. 29, 2011.
U.S. Appl. No. 12/303,391, Final Office Action May 11, 2011.
U.S. Appl. No. 10/344,176, Office Action May 16, 2011.
U.S. Appl. No. 11/074,453, Requirement for Election May 23, 2011.
U.S. Appl. No. 12/303,388 Response Jun. 8, 2011.
U.S. Appl. No. 12/303,395 Final Office Action Jun. 13, 2011.
U.S. Appl. No. 12/333,465, Response filed Jun. 30, 2011.

U.S. Appl. No. 12/122,549, Response filed Jul. 21, 2011.
U.S. Appl. No. 12/303,388 Final Office Action Jul. 5, 2011.
U.S. Appl. No. 11/189,647, Final Office Action Jun. 22, 2011.
U.S. Appl. No. 12/477,225, Non Final Office Action Jul. 8, 2011.
U.S. Appl. No. 12/441,447, Non Final Office Action Aug. 1, 2011.
U.S. Appl. No. 12/477,179, Non final office action Jul. 22, 2011.
U.S. Appl. No. 12/122,549, Final Office Action Oct. 6, 2011.
U.S. Appl. No. 12/477,189 non final Office Action Aug. 5, 2011.
U.S. Appl. No. 12/303,391 RCE response Aug. 11, 2011.
U.S. Appl. No. 11/189,647, Response Aug. 12, 2011.
U.S. Appl. No. 12/303,388 Response Sep. 2, 2011.
U.S. Appl. No. 12/477,213 Non Final Office Action Aug. 9, 2011.
U.S. Appl. No. 12/442,549 non Final Office Action Sep. 19, 2011.
U.S. Appl. No. 12/477,225 Final Office Action Sep. 28, 2011.
U.S. Appl. No. 12/33465 Final Office Action Oct. 4, 2011.
U.S. Appl. No. 12/477,179, Response filed Oct. 24, 2011.
U.S. Appl. No. 12/721,619, Preliminary Amendment filed Nov. 3, 2011.
U.S. Appl. No. 11/074,453, Office Action Oct. 11, 2011.
U.S. Appl. No. 12/912,040, Office Action Oct. 20, 2011.
U.S. Appl. No. 12/441,447, Response filed Nov. 1, 2011.
U.S. Appl. No. 12/477,189, Response filed Nov. 4, 2011.
U.S. Appl. No. 11/903,607, Office Action Nov. 30, 2011.
U.S. Appl. No. 12/477,189 Final Office Action Dec. 5, 2011.
U.S. Appl. No. 12/122,549, RCE response Jan. 6, 2012.
U.S. Appl. No. 12/912,009 Non-final Office Action Dec. 19, 2011.
U.S. Appl. No. 11/794,830, Non-Final Rejection Dec. 19, 2011.
U.S. Appl. No. 09/876,311, Response to Office Action Feb. 5, 2009.
U.S. Appl. No. 09/876,311, Response to Office Action May 28, 2009.
U.S. Appl. No. 09/876,311, Response to Office Action Sep. 10, 2009.
U.S. Appl. No. 09/876,311, Response to Office Action May 17, 2010.
U.S. Appl. No. 09/982,274, filed Oct. 17, 2001.
U.S. Appl. No. 09/982,274, Final Rejection Nov. 27, 2006.
U.S. Appl. No. 09/982,274, Final Rejection May 6, 2008.
U.S. Appl. No. 09/982,274, Final Rejection Jun. 9, 2009.
U.S. Appl. No. 09/982,274, Non-Final Rejection Mar. 3, 2006.
U.S. Appl. No. 09/982,274, Non-Final Rejection Aug. 9, 2007.
U.S. Appl. No. 09/982,274, Non-Final Rejection Oct. 17, 2008.
U.S. Appl. No. 09/982,274, Response to Office Action Sep. 6, 2006.
U.S. Appl. No. 09/982,274, Response to Office Action May 29, 2007.
U.S. Appl. No. 09/982,274, Response to Office Action Jan. 22, 2008.
U.S. Appl. No. 09/982,274, Response to Office Action Aug. 6, 2008.
U.S. Appl. No. 09/982,274, Response to Office Action Feb. 17, 2009.
U.S. Appl. No. 09/982,274, Notice of Appeal filed Sep. 9, 2009.
U.S. Appl. No. 09/982,274, Appeal Brief Filed Nov. 9, 2009.
U.S. Appl. No. 09/982,274, Reply Brief filed Apr. 2, 2010.
U.S. Appl. No. 12/112,165, filed Apr. 30, 2001.
U.S. Appl. No. 10/251,120, filed Sep. 20, 2002.
U.S. Appl. No. 10/251,120, Final Rejection Dec. 31, 2007.
U.S. Appl. No. 10/251,120, Final Rejection Jun. 25, 2009.
U.S. Appl. No. 10/251,120, Non-Final Rejection Mar. 29, 2007.
U.S. Appl. No. 10/251,120, Non-Final Rejection Jan. 5, 2009.
U.S. Appl. No. 10/251,120, Examiner Summary Oct. 21, 2009.
U.S. Appl. No. 10/251,120, Examiner Summary Jul. 6, 2010.
U.S. Appl. No. 10/251,120, Response to Office Action Sep. 28, 2007.
U.S. Appl. No. 10/251,120, Response to Office Action Oct. 7, 2008.
U.S. Appl. No. 10/251,120, Response to Office Action Apr. 6, 2009.
U.S. Appl. No. 10/251,120, Appeal Brief Filed Mar. 24, 2010.
U.S. Appl. No. 12/122,549, filed May 16, 2008.
U.S. Appl. No. 11/198,206, filed Aug. 5, 2005.
U.S. Appl. No. 11/198,206, Final Rejection Jan. 23, 2009.
U.S. Appl. No. 11/198,206, Non-Final Rejection Jun. 30, 2008.
U.S. Appl. No. 11/198,206, Response to Office Action Oct. 30, 2008.
U.S. Appl. No. 12/333,465, filed Dec. 12, 2008.
U.S. Appl. No. 12/262,266, filed Oct. 31, 2008.
U.S. Appl. No. 12/303,388, filed Dec. 4, 2008.
U.S. Appl. No. 12/303,391, filed Dec. 4, 2008.
U.S. Appl. No. 12/303,395, filed Dec. 4, 2008.
U.S. Appl. No. 12/303,399, filed Dec. 4, 2008.
U.S. Appl. No. 12/441,447, filed Mar. 16, 2009.
U.S. Appl. No. 10/344,176, filed Aug. 15, 2003.
U.S. Appl. No. 10/344,176, Final Rejection Oct. 30, 2008.
U.S. Appl. No. 10/344,176, Final Rejection Mar. 2, 2010.
U.S. Appl. No. 10/344,176, Non-Final Rejection Dec. 19, 2007.
U.S. Appl. No. 10/344,176, Non-Final Rejection Jun. 8, 2009.
U.S. Appl. No. 10/344,176, Response to Office Action May 19, 2008.
U.S. Appl. No. 10/344,176, Response to Office Action Mar. 2, 2009.
Andrew Cohen; Putting Wellness to work; date Mar. 1, 1997; Athletic Business, pp. 1-7.
www.netpulse.net; Netpulsue Makes Working Out More than a Calorie-Burning Session; date Mar. 21, 1998, pp. 1-2.
www.netpulse.net; 24 Hour Fitness Partners with Netpulse; date Mar. 9, 1998; p. 1.
Trends in Medical Benefit Plan Design to Control Claim Costs; Record of Society of Actuaries; date 1982; vol. 8, No. 2, pp. 515-531.
David Richards, Return of Premium Disability Insurance; The Black Hole, dated Jul. 15, 2010, p. 1-4.
"Sidelines" WWD, p. 10—STIC Scientific and Technical Information Center, Feb. 3, 2000.
Co-pending U.S. Appl. No. 11/074,453, Final Office Action mailed Jul. 19, 2010.
Co-pending U.S. Appl. No. 11/189,647, Request for Continued Examination filed Jul. 19, 2010.
Co-pending U.S. Appl. No. 11/715,181, Response filed Aug. 12, 2010.
Co-pending U.S. Appl. No. 12/112,165, Non-final Office Action mailed Sep. 2, 2010.
Co-pending U.S. Appl. No. 10/251,120, Request for Continued Examination filed Oct. 6, 2010.
Co-pending U.S. Appl. No. 12/303,391, Non final Office Action mailed Nov. 24, 2010.
Co-pending U.S. Appl. No. 11/074,453, Response to final office action Dec. 20, 2010.
Co-pending U.S. Appl. No. 09/876,311, Non-final Office Action mailed Jul. 9, 2010.
Rintelman, Mary Jane, "Choice and cost-savings", Credit Union Management, vol. 19, No. 7, pp. 48, 50. Jul. 1996.
Woodard, Kathy, "stay healthy for real fun—and profit", Business First Columbus, vol. 12, No. 19, S.1, p. 13. Jan. 1996.
Spencer, Peter L., "New plan cuts health car costs in half (advantage of health care plan with high deductible)", Consumers' Research Magazine, vol. 76, No. 10, pp. 16. Oct. 1993.
Commumuity Hearth Health Programs: Components, Ratio: John P. Elder, Thomas L. Schmid, Phyillis Dower and Sonja Hedlund; Journal of Public Health Policy; Palgrave Macmillian; 1993 winter; pp. 463-479.
Ferling ("New plans, New policies," Ferling, Rhona. Best's Review; Apr. 1993 p. 78).
"Plan Highlights for El Paso ISD" Salary Protection Insurance Plan, web-site—http://w3.unumprovident.com/enroll/elpasoisd/your_plan.htm, Mar. 3, 2008.
Consumer-Driven Health Plans Catch on as Myths Fall by Wayside (Sep. 4). PR Newswire, 1.
Art Technology Group; Discovery Holdings to exploit online interest in healthcare and life assurance with ATG commerce functionality; Revenue potential significant as 70% of Discovery members access the internet. (Oct. 28). M2 Presswire, 1.
"Absenteeism Control"; Cole, Thomas C. et al; Management Decision; London: 1992. vol. 20, Iss. 2; p. 12 (AC).
Saleem, Haneefa: "Health Spending Accounts"; Dec. 19, 2003; posted online at http://www.bls.gov/opub/cwc/print/cm20031022ar01p1.htm.
Insure.com; "The lowdown on life insurance medical exams"; Jun. 28, 2006; Imaged from the Internet Archive Waybackmachine on May 10, 2006 at http://web.archive.org/web/20060628231712/http://articles.moneycentral.msn.com/Insurance/Insureyourlife/thelowdownonlifeinsurancwernedicalexams.aspx.
Definition of insurance, New Penguin Business Dictionary, Retreieved Oct. 26, 2008 from http://www.credoreference.com/entry/6892512/.
U.S. Appl. No. 10/344,176, Response to Office Action Nov. 9, 2009.
U.S. Appl. No. 11/189,647, filed Jul. 26, 2005.
U.S. Appl. No. 11/189,647, Final Rejection May 11, 2010.
U.S. Appl. No. 11/189,647, Non-Final Rejection Aug. 14, 2009.
U.S. Appl. No. 11/189,647, Response to Office Action Feb. 15, 2010.
U.S. Appl. No. 10/819,256, filed Apr. 6, 2004.

U.S. Appl. No. 10/819,256, Final Rejection Jan. 6, 2009.
U.S. Appl. No. 10/819,256, Non-Final Rejection Mar. 18, 2008.
U.S. Appl. No. 10/819,256, Response to Office Action Sep. 18, 2008.
U.S. Appl. No. 11/097,947, filed Apr. 1, 2006.
U.S. Appl. No. 11/097,947, Non-Final Rejection Nov. 10, 2009.
U.S. Appl. No. 11/097,947, Final Rejection Jun. 7, 2010.
U.S. Appl. No. 11/097,947, Response to Office Action Mar. 10, 2010.
U.S. Appl. No. 10/818,574, filed Apr. 6, 2004.
U.S. Appl. No. 10/818,574, Non-Final Rejection Feb. 4, 2009.
U.S. Appl. No. 10/818,574, Response to Office Action May 4, 2009.
U.S. Appl. No. 11/074,453, filed Mar. 8, 2005.
U.S. Appl. No. 11/074,453, Non-Final Rejection Mar. 4, 2009.
U.S. Appl. No. 11/074,453, Requirement for Election Mar. 31, 2010.
U.S. Appl. No. 11/074,453, Notice of Non-compliant response Nov. 9, 2009.
U.S. Appl. No. 11/074,453, Response to Office Action Apr. 29, 2010.
U.S. Appl. No. 11/074,453, Response to Office Action Nov. 23, 2009.
U.S. Appl. No. 11/074,453, Response to Office Action Jul. 6, 2009.
U.S. Appl. No. 11/794,830, filed Jan. 22, 2008.
U.S. Appl. No. 11/794,830, Final Rejection Dec. 7, 2009.
U.S. Appl. No. 11/794,830, Non-Final Rejection May 27, 2009.
U.S. Appl. No. 11/794,830, Response to Office Action Sep. 28, 2009.
U.S. Appl. No. 11/794,830, Response to Office Action Apr. 7, 2010.
U.S. Appl. No. 11/903,607, filed Sep. 24, 2007.
U.S. Appl. No. 11/903,607, Final Rejection Jan. 28, 2010.
U.S. Appl. No. 11/903,607, Non-Final Rejection May 13, 2009.
U.S. Appl. No. 11/903,607, Response to Office Action Aug. 12, 2009.
U.S. Appl. No. 11/903,607, Response to Office Action Apr. 28, 2010.
U.S. Appl. No. 12/442,549, filed Mar. 24, 2009.
U.S. Appl. No. 12/477,179, filed Jun. 3, 2009.
U.S. Appl. No. 12/303,388, Non-Final Office Action mailed Mar. 11, 2011.
U.S. Appl. No. 12/477,213, filed Jun. 3, 2009.
U.S. Appl. No. 12/477,225, filed Jun. 3, 2009.
U.S. Appl. No. 12/477,189, filed Jun. 3, 2009.
U.S. Appl. No. 12/721,619, filed Mar. 11, 2010.
U.S. Appl. No. 11/715,181, filed Mar. 7, 2007.
U.S. Appl. No. 11/715,181, Non-Final Rejection Nov. 3, 2009.
U.S. Appl. No. 11/715,181, Non-Final Rejection May 12, 2010.
U.S. Appl. No. 11/715,181, Response to Office Action Feb. 3, 2010.
U.S. Appl. No. 12/303,395, Non-Final Rejection Jan. 24, 2011.
U.S. Appl. No. 12/912,009 filed Oct. 26, 2010.
U.S. Appl. No. 12/912,040 filed Oct. 26, 2010.
U.S. Appl. No. 12/112,165, Final Rejection Feb. 10, 2011.
U.S. Appl. No. 11/715,181, Response to Office Action Mar. 11, 2011.

* cited by examiner

MANAGING AN INSURANCE PLAN

BACKGROUND OF THE INVENTION

The present application relates to a system and method of managing an insurance scheme.

The present invention may be implemented by a traditional life insurance plan operator for its members or may be implemented by another party.

Conventionally, insurance policies such as life insurance policies operate on the basis that an insured person, sometimes referred to as an insured life, pays a premium to the life insurer, and the life insurer pays a predetermined sum, referred to as the sum assured, to the insured life or his/her beneficiary on the occurrence of an insured event. Typical insured events are the insured life suffering disability, contracting a dread disease or dying.

It is clearly in both the insurer and insured parties' best interests that an insured event does not occur. One way of reducing the risk is for the insured person to look after their wellness.

However, the insured party needs some motivation to look after their wellness despite the risks associated with not doing so.

The present invention provides a system and method of addressing this.

SUMMARY OF THE INVENTION

According to one example embodiment, a system for managing an insurance scheme includes:
  a benefit module to define at least one insured event for an insured person and to define at least one benefit to be paid out on the occurrence of one of the insured events;
  a monitoring module to monitor the compliance of the insured person with a wellness programme;
  a calculation module to alter the at least one benefit based on the degree of participation of the insured person with the wellness programme; and
  an awards module to, on the occurrence of the at least one insured event, provide the at least one altered benefit to the insured person.

The monitoring module may monitor the compliance of the insured person with the wellness programme by receiving insured person usage information associated with the insured person's usage of the wellness programme.

The usage information received typically includes information associated with a plurality of separate and distinct occurrences of wellness programme participation by the insured person.

In one example, the monitoring module determines, based on the usage information, a points value or a status level associated with the insured person for the wellness programme, wherein the points value or the status level indicates a degree of participation in the wellness programme and wherein the calculation module uses the points value or status level to calculate the percentage amount and the calculation module then alters the at least one benefit by a percentage wherein the amount of the percentage is related to the degree of participation of the insured person with the wellness programme.

In one example, the monitoring module monitors the compliance of the insured person with the wellness programme by:
  receiving insured person participation information associated with the insured person's participation in the wellness program; and
  determining, based on the participation information, a status level associated with the insured person for the wellness program, wherein the status level indicates a degree of participation in the wellness program.

In this example, the calculation module alters the at least one benefit based on the status level.

According to another example embodiment, apparatus for managing an insurance scheme includes:
  means for defining at least one insured event for an insured person and for defining at least one benefit to be paid out on the occurrence of one of the insured events;
  means for monitoring the compliance of the insured person with a wellness programme;
  means for altering the at least one benefit based on the degree of participation of the insured person with the wellness programme; and
  means for, on the occurrence of the at least one insured event, provide the at least one altered benefit to the insured person.

DESCRIPTION OF EMBODIMENTS

The systems and methodology described herein relate to a system and method of managing an insurance scheme such as a life insurance scheme to name one example.

Conventional life insurance schemes operate on the basis that an insured person, referred to as the insured life, pays premiums on a regular basis to the life insurer, specifying a sum assured which is an amount to be paid out on the occurrence of an insured event. For example, on the death of the insured life, a predetermined death benefit is paid to the nominated beneficiaries of the insured life. If the insured life is disabled or suffers a dread disease the same or a different amount is paid out.

The method and system will be described with reference to these kinds of schemes but it will be appreciated that the method and system could equally be applied to other types of insurance schemes.

It will also be appreciated that the system and methodology may be implemented by any relevant person or organisation. For example, the system and methodology may be operated by the organisation which operates the life insurance scheme or may be implemented by another associated organisation. In one example the system and methodology may be implemented by a financial organisation which issues credit cards to its members.

For purposes of illustration only, the system and methodology will be described herein as being operated by the managers of a life insurance scheme.

Figure 1:
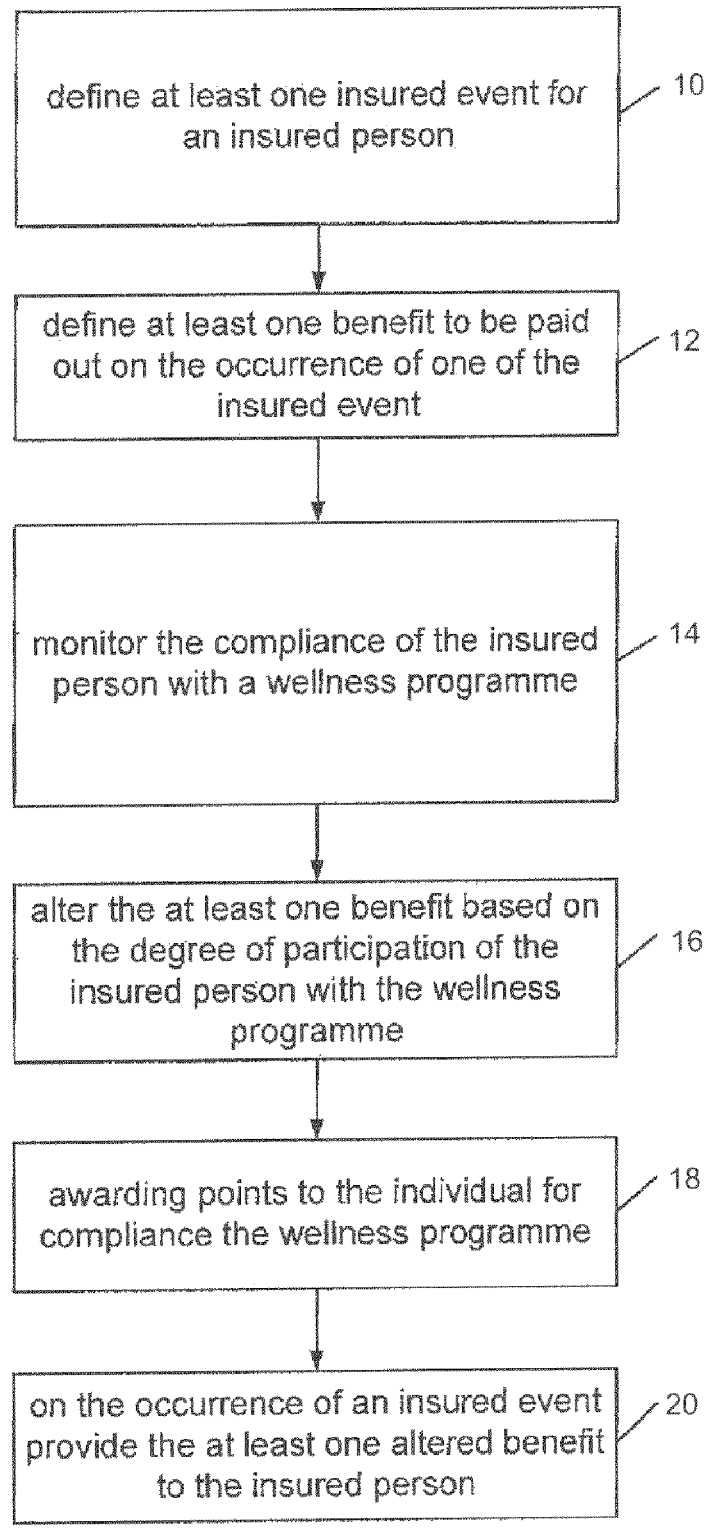
FIG. 1 is a flow chart illustrating the methodology of an example embodiment.

Referring to FIG. 1, at least one insured event is defined (block 10). Typically a plurality of insured events are defined, the plurality of insured events in the example include disability, contracting a dread disease or dying as these are typical of the kind of events which are insured by life insurance schemes. However, it will be appreciated that in other contexts these insured events may be other events such as the birth of a child or changing jobs to name but a few examples.

In any event, the occurrence of an insured event for an insured person of the scheme results in at least one benefit being paid out to the insured person.

The at least one benefit could be any kind of benefit. For example the at least one benefit could be a single lump sum cash payout, the commencement of a periodic cash payout, the at least partial subsidising of expenses in the category of living expenses or the subsidising of health insurance plan premiums to name but a few examples.

In addition, the at least one benefit could be the combination of more than one of the above example benefits.

The at least one benefit will be paid out to the insured person or a nominated beneficiary of the insured person. Typically the benefit is arranged for the insured person but where the insured person has died or is otherwise incapacitated the benefit will be activated for a beneficiary that the insured person has nominated prior to the event.

In the next step (block 14), the compliance of the insured person with a wellness programme is monitored.

An example of such a wellness program is presently managed by the applicant that manages a traditional life and health insurance plan together with their wellness program disclosed in the applicant's South African granted patent number ZA 99/1746, the contents of which are incorporated herein by reference.

In an example wellness program, members participate in approved related facilities and/or services. For example, members use gymnasiums, Smoke Enders™ and Weighless™.

In one example, members are awarded points and depending on the total number of points allocated to a member, they fall within one of five statuses. In the implementation of the wellness program, these statuses have been named in ascending order of value, blue, bronze, silver, gold and diamond. All members are placed initially in the blue status. Once a member has accumulated a predetermined number of points, his/her status is upgraded to the next appropriate level.

It will be appreciated that for purposes of the present invention the wellness programme could be operated by the insurer or could be operated by a third party that operates the wellness programme and then informs the insurer of the degree of participation of the insured person with the wellness programme.

This could occur by a third party transmitting data to at least one server 22 (FIG. 2) operated by the insurer. The data is received at the at least one server 22 and stored in a database 32 associated with the at least one server.

In one example the data will include at least an identity of the insured person and data identifying the status of the insured person, for example blue, bronze, silver, gold and diamond.

In order to determine the status, a monitoring of the compliance of the insured person with the wellness programme includes receiving insured person usage information associated with the insured person's usage of the wellness program and determining, based on the usage information, a status level associated with the insured person for the wellness program, wherein the status level indicates a degree of participation in the wellness program The usage information received may include information associated with a plurality of separate and distinct occurrences of wellness program participation by the insured person.

In addition, the method may further include determining a status level associated with the insured person that further includes receiving the usage information from an information processing system and assigning a given point value to each separate and distinct occurrence of wellness program participation.

A total point value is determined based on an accumulation of each given point value assigned to each separate and distinct occurrence of wellness program participation The total point value is then compared to a plurality of point ranges, each point range in the plurality of point ranges being associated with a status level and identifying a point range in the plurality of point ranges corresponding to the total point value.

Finally, a status level is assigned that is associated with the point range that has been identified to the at least one employee.

Based on the degree of participation of the insured person with the wellness programme the at least one benefit is altered (block 16).

In one example the at least one benefit may be altered by a percentage wherein the amount of the percentage is related to the degree of participation of the insured person with the wellness programme.

In another example embodiment, the at least one benefit may be altered by a formula calculated as set out below. For purposes of illustration the at least one benefit will be described as an amount of money referred to as a life fund.

$$\text{Annual Adjustment} = \text{life fund (prior to ABI for that anniversary)} \times \text{Integrated Cover \%} \times \text{Vitality Adjustment \%} \quad \text{Formula 1}$$

ABI is the automatic benefit increase that typically occurs annually based on the policy terms and conditions.

Integrator Cover % refers to the additional cover or sum assured expressed as a percentage of the main sum assured. I.e. Additional Benefit Integration Cover/Life Fund.

Where the Vitality Adjustment is the wellness programme adjustment and is determined by the following table:

| Vitality Status | Blue | Bronze | Silver | Gold | Diamond |
|---|---|---|---|---|---|
| Vitality Adjustment | 3.75% | 2.75% | 1.50% | 0.00% | −0.75% |

Because of the use of the above percentages in the formulae below, the negative percentage will increase the total cover while the positive percentages will decrease the total cover.

$$\text{Integrated Cover after anniversary} = (\text{Integrated Cover (prior to anniversary)} - \text{Annual Adjustment}) \times (1 + \text{ABI}) \quad \text{Formula 2}$$

An example of applying formula 1 and 2 above is as follows for a set of facts as follows:

| | |
|---|---|
| Entry Age (next): = | 41 |
| Life Fund = | R1 000 000 |
| Extra integrated cover being 20% of Life Fund (prior to anniversary) = | R200 000 |
| Benefit escalation rate (ABI) = | 10% |
| Vitality status at 90 days = | Bronze |

Applying formula 1 results in:

Annual Adjustment (anniversary 1)=$R5,500=(R1,000,000 \times 20\% \times 2.75\%)$ Integrated Cover (after 1st anniversary)=$(R200,000-R5,500) \times (1+10\%)=R213,950$ Life Fund (after 1st anniversary)=$R1,100,000$ Annual Adjustment (anniversary 2)=$R6,050$=($R1,100,000 \times 20\% \times 2.75\%$)

Integrated Cover (after anniversary 2)=$R228,690$=($R213,950-R6,050) \times (1+10\%)$)

In one example embodiment certain maximum and minimum increases may apply.

On the occurrence of an insured event the at least one altered benefit is proved to the insured person.

It will be appreciated that whatever method is used to alter the at least one benefit this will result in a larger benefit for the insured person on occurrence of an insured event. However, often with insurance type plans, if an insured event does not occur the insured person will receive no benefit.

In order to enhance the motivational factor of the method described above, the altered benefit could be provided to the insured person at a predetermined age and in any one of a number of predetermined manners without the occurrence of an insured event.

In one example, the extra benefit accrued to the insured person as a result of their complying with the wellness programme is used to determine an additional benefit provided to the insured person at the predetermined age. This will typically only be provided if no insured events have occurred or if less than a limited predetermined number of insured events have occurred.

In an example embodiment the predetermined age may be 65 which is a typical retirement age.

Thus, where the extra benefit accrued is a percentage over and above a baseline insured amount, this extra percentage will be provided to the insured person. Alternatively, the extra benefit accrued may be quantified in some manner and depending on the quantity, a different amount may be provided to the insured person as an additional benefit.

The additional benefit could be one or more of:
an amount to be used for health insurance plan funding;
an amount to be used for retirement funding;
retain the extra benefit for any future insured event; and
a combination of the above.

To illustrate the example of using the amount for health insurance plan funding, the following table could be used to calculate the health insurance plan funding:

|  | % Remaining Cover | | | |
| --- | --- | --- | --- | --- |
|  | 20%-30% | 31%-50% | 51%-75% | 76%+ |
| Health Discount | 15% | 20% | 25% | 35% |

The above table typically applies where the insurer also provides health insurance or is associated with another entity that provides health insurance which is why the amount is reflected as a health discount. If this were not the case the amount would more likely be used to subside payments to a health insurer.

It will be appreciated though that the bands of extra or remaining cover is converted into a percentage to be used for the health discount which percentage will be a percentage discount on the amount being paid for health insurance, for example.

In addition to the above, the method may include altering the at least one benefit based on the amount of claims that the insured person makes to their health insurance plan. In this example, the lower the amount of claims the higher the benefit will be.

For example, the total amount of claims could be arranged into ranges wherein a percentage is associated with each of the ranges, the percentage being a percentage to be used to alter the benefit.

In addition, the insured person can be motivated to take health assessments at regular intervals and if they do comply this is also used to alter the benefit.

It should be noted that the adjustment to the benefit is calculated prior to a claim and not related to a specific claim. Only the engagement in the wellness program influences the benefit adjustment and not a specific claim.

Figure 2:
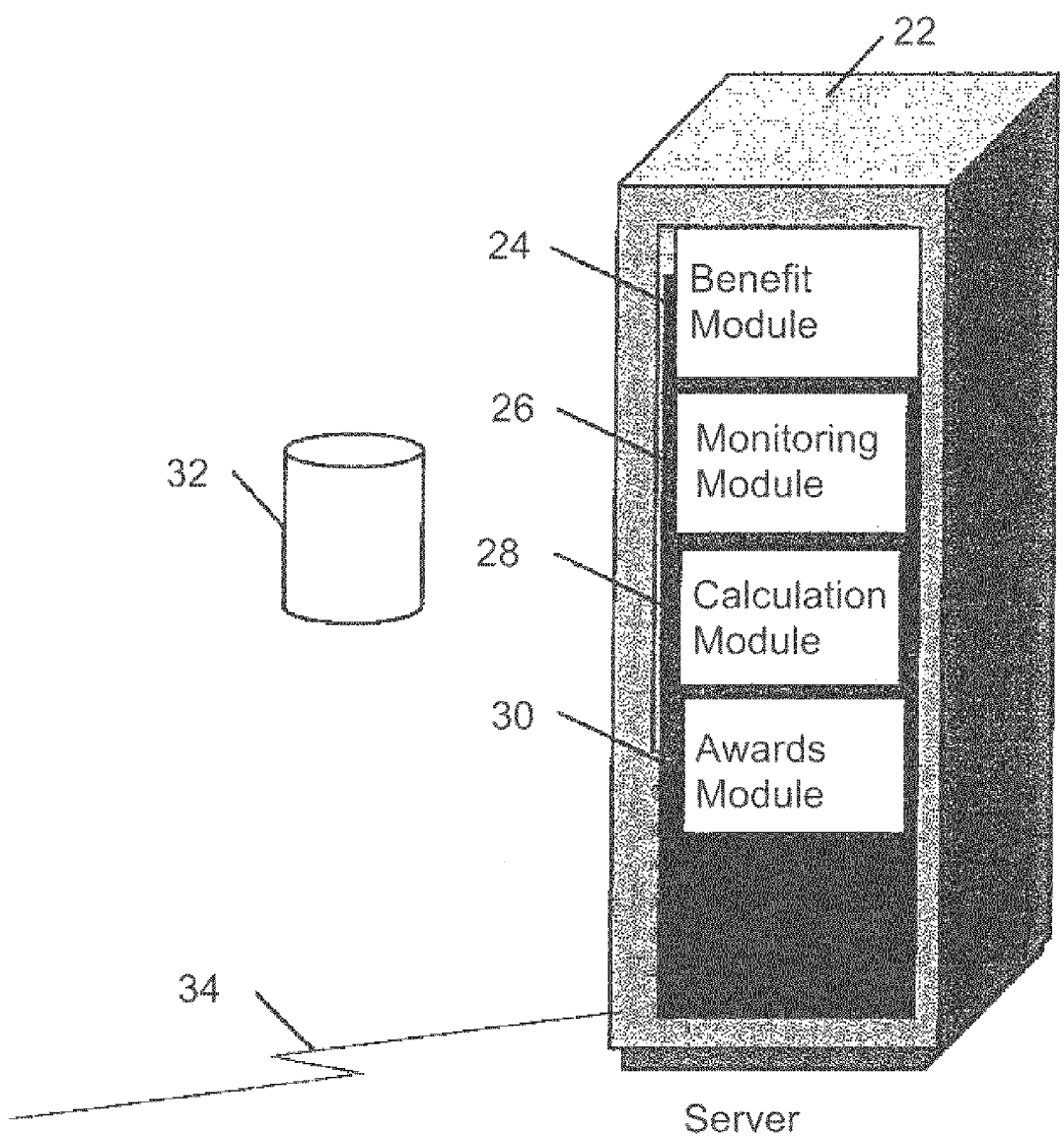
FIG. 2 is a block diagram illustrating an example system to implement the methodologies described herein.

Finally, where the insured person has a credit card issued by the insurer or an associated company, the spend on the credit card can be used to alter the benefit FIG. 2 illustrates an exemplary system for implementing the above methodologies.

A server 22 includes a number of modules to implement the methodologies described above.

A benefit module 24 defines a plurality of insured events for an insured person and defines at least one benefit to be paid out on the occurrence of one of the insured events.

The module 24 is constructed to define the plurality of insured events which in one embodiment includes disability, contracting a dread disease or dying as these are typical of the kind of events which are insured by life insurance schemes. However, it will be appreciated that in other contexts these life changing events may be other events.

Once the benefit module 24 defines the plurality of life changing events, the module 24 accesses a memory and stores the defined plurality of categories of expenses in the memory.

In one example embodiment, the memory could take the form of the database 32. In other embodiments the memory could be located on the server 20 or on another server not illustrated in this example system. In either case, the memory is in data communication with the module 24 and accessible by the module 24 which is able to read and write data to the memory.

A monitoring module 26 is specifically constructed to define a wellness programme and monitor the compliance of the wellness programme by the insured person.

The monitoring of the compliance of the insured person with the wellness programme includes receiving by the monitoring module 26, insured person usage information associated with the insured person's usage of the wellness programme.

The usage information received may include information associated with a plurality of separate and distinct occurrences of wellness programme participation by the insured person.

The monitoring module 26 determines, based on the usage information, a points value or a status level associated with the insured person for the wellness programme, wherein the points value or the status level indicates a degree of participation in the wellness programme In addition, the monitoring module 26 may further be constructed to determine a status level associated with the insured person by receiving the usage information from an information processing system and assigning a given point value to each separate and distinct occurrence of wellness programme participation.

A total point value is determined by the monitoring module 26 based on an accumulation of each given point value assigned to each separate and distinct occurrence of wellness programme participation The total point value is then compared to a plurality of point ranges by the monitoring module 26, each point range in the plurality of point ranges being associated with a status level and identifying a point range in the plurality of point ranges corresponding to the total point value.

Finally, a status level is assigned by the monitoring module 26 that is associated with the point range that has been identified to the at least one employee.

The monitoring module 26 then writes the total points value or the status level to a memory, for example the database 32.

In either case the calculation module 26 accesses the memory and retrieves the stored total points value or status level.

The calculation module 28 is constructed to alter the at least one benefit based on the degree of participation of the insured person with the wellness programme as has been described above.

An awards module 30, on the occurrence of an insured event, provides the at least one altered benefit to the insured person.

In one example, the awards module 30 is connected via a communications network, for example communications network 34, to a financial institution which it instructs to pay out a cash amount to the insured person or their nominated beneficiaries.

The system includes at least one associated database 32 for storing data to be used by one or more of the above referenced modules.

In addition, the server is typically connected to a communications network 34 for communications with other computers to implement the methodologies described above.

The modules described above may be implemented by a machine-readable medium embodying instructions which, when executed by a machine, cause the machine to perform any of the methods described above.

It will be appreciated that embodiments of the present invention are not limited to such architecture, and could equally well find application in a distributed, or peer-to-peer, architecture system. Thus the modules illustrated could be located on one or more servers operated by one or more institutions.

In another example embodiment the modules may be implemented using firmware programmed specifically to execute the method described herein.

It will also be appreciated that in any of these cases the modules form a physical apparatus with physical modules specifically for executing the steps of the method described herein.

Operating Environment

Figure 3:
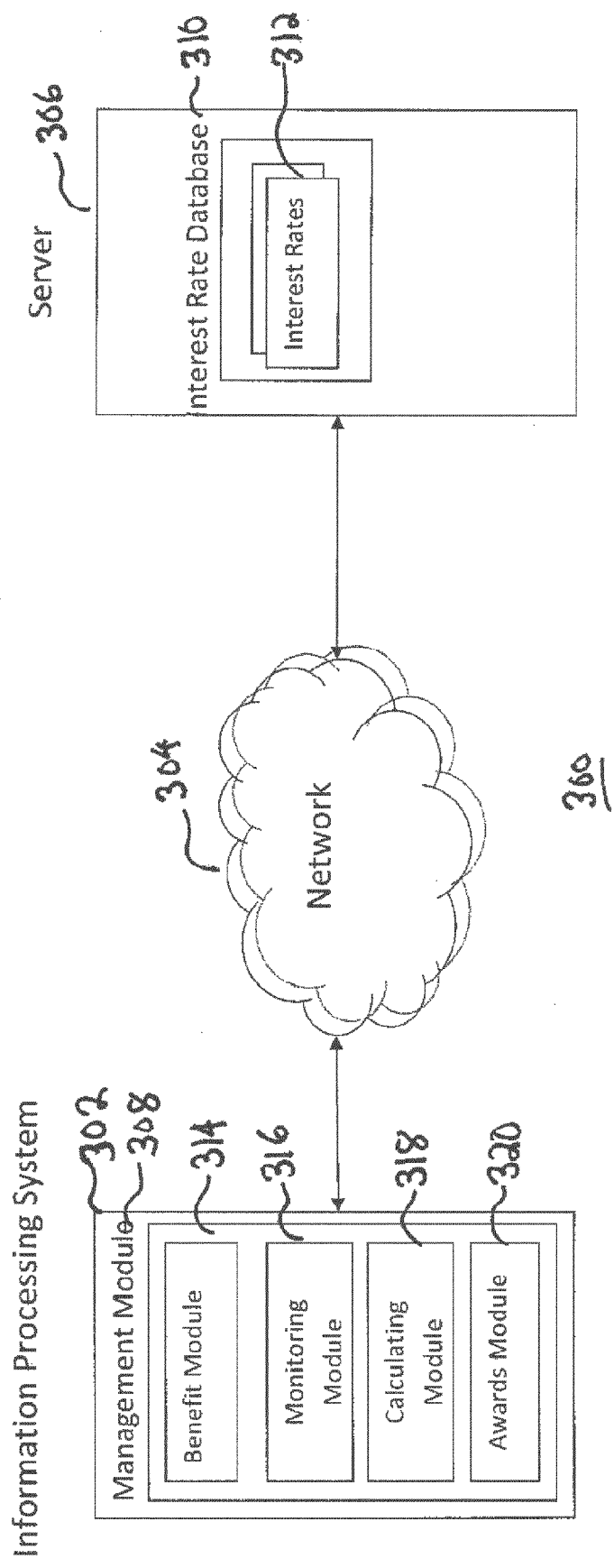
FIG. 3 is a block diagram illustrating an example of one operating environment of the system in FIG. 2.

According to one embodiment of the present invention, as shown in FIG. 3, a system and method of 300 for managing an insurance scheme/product is shown. In one embodiment, the system 300 includes one or information processing systems 302 associated with an insurance provider, a network 304, and one or more servers 306. It should be noted that the information processing system 302 is not restricted to being associated with the entity providing insurance to individuals, but can be associated with another entity as well. The insurance provider can provide one or more types of insurance such as a (but not limited to) life insurance scheme to name one example and/or medical insurance to individuals.

The network 304, in one embodiment, is a wide area network, local area network, wireless network, or the like. The information processing system 302 includes a management module 308. The management module 308, in one embodiment, manages an insurance scheme/product. For example, the management module 308, in one example, manages a life insurance product. In this example, the management module 308 manages the benefits of the life insurance product such as a benefit payout by adjusting a monthly benefit payout to an insured person (or beneficiary).

In one embodiment, the server 306 comprises a database 310 including interest rate information 312 that the management module 308 uses to manage the insurance scheme/product. The management module 308 generates or transforms the rate information 312 into an adjustment value for the insurance benefits. This process was discussed in greater detail above. The management module 308, in one embodiment, includes a benefit module 314, a monitoring module 316, a calculating module 318, and an awards module 320. It should be noted that although this modules 314, 316, 318, 320 are shown as residing within the management module 308, one or more of these modules can reside outside of the management module 308 within the system 302 and/or across multiple information processing systems as well.

The operational flows shown in FIG. 1 illustrate one example of managing an insurance product according to one embodiment of the present invention. In particular, FIG. 1 shows a process performed by the management module 308 and its components 314, 316, 318, 320 within the information processing system(s) 302.

Non-Limiting Examples

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

Although the various embodiments of the present invention are described in the context of a fully functional computer system, those skilled in the art will appreciate that embodiments are capable of being distributed as a program product via CD or DVD, e.g. CD, CD ROM, or other form of recordable media.

The invention claimed is:

1. An apparatus for managing an insurance plan, the apparatus comprising:
at least one computer server including software executing within said at least one computer from non-transitory storage medium, the software configured to
define at least one insured event for an insured person and for defining at least one benefit to be paid out on the occurrence of one of the at least one insured event;
receive information pertaining to participation of the insured person with a wellness program;
calculate one of the at least one altered benefit, an Integrated Cover, based on the degree of participation of the insured person with the wellness program after a time period, according to the formulae $x = (a*b)$, and $y = (a-x)$, where
x=an Adjustment for the time period,
y=an Integrated Cover after the time period,
a=a starting benefit or Integrated Cover Amount, and
b=a Participation Rate reflecting received information pertaining to participation of the insured person with the wellness program during the time period, the participation rate selected from a series of stepped adjustment percentages, with a lower percentage reflecting an increased participation; and cause, on the occurrence of the at least one insured event, the at least one altered benefit to be payed out.

2. The apparatus of claim 1, wherein the software is further configured to monitor the compliance of the insured person with the wellness program by receiving insured person usage information associated with the insured person's usage of the wellness program.

3. The apparatus of claim 2 wherein the usage information received includes information associated with a plurality of separate and distinct occurrences of wellness program participation by the insured person.

4. The apparatus of claim 1, wherein after a second time period, the software is configured to calculate a Previously presented x value, x', according to the formula:

$$x=(a*b*c),$$

where c=an Integrated Cover Rate.

5. The apparatus of claim 1, wherein y is further calculated as $$y=(a-x)*(1+d),$$

where d=a Benefit Escalation Rate applied each period.

6. The apparatus of claim 5, wherein the Benefit Escalation Rate is between 0% and 10%.

7. The apparatus of claim 1, wherein a smaller b value represents a larger y value.

8. The apparatus of claim 1, wherein after a second time period, the software is configured to calculate a Previously presented x value, x', according to the formula:

$$x'=(a*b*c),$$

where c=an Integrated Cover Rate.

9. The method of claim 8, wherein after a second time period, the software is configured to calculate a Previously presented y value, y', according to the formula:

$$y'=(y-x').$$

10. The apparatus of claim 1, wherein after a second time period, the software is configured to calculate a Previously presented y value, y', according to the formula:

$$y'=(y-x).$$

11. The apparatus of claim 1, wherein the information received pertaining to participation is obtained by monitoring the participation of the insured person.

12. The apparatus of claim 1, wherein the usage information received includes information associated with a plurality of separate and distinct occurrences of wellness program participation by the insured person.

13. The apparatus of claim 1, wherein the information received pertaining to participation is associated by the software with a range of a defined set of ranges of participation, and a Participation Rate is associated with each range of the defined set of ranges.

14. The apparatus of claim 1, wherein the insurance plan is life insurance.

15. The method of claim 1, wherein the insured event is selected from disability, disease, death, and reduction in income.

16. A method for managing an insurance program, comprising:

using software executing within at least one computer from non-transitory storage medium to define at least one insured event for an insured person and for defining at least one benefit to be paid out to a beneficiary on the occurrence of one of the at least one insured event;

receive information pertaining to participation of the insured person with a wellness program;

calculate one of the at least one altered benefit, an Integrated Cover, based on the received information pertaining to participation of the insured person with the wellness program after a time period, according to the formulae $$x=(a*b), \text{ and}$$

$$y=(a-x),$$

where x=an Adjustment for the time period, y=an Integrated Cover after the time period, a=a starting benefit or Integrated Cover Amount, and b=a Participation Rate reflecting an extent of participation of the insured person with the wellness program during the time period, the participation rate selected from a series of stepped adjustment percentages, with a lower percentage reflecting an increased participation; and cause, on the occurrence of the at least one insured event, the at least one altered benefit to be payed out.

17. The method of claim 16, wherein y is further calculated as $$y=(a-x)*(1+d),$$

where d=a Benefit Escalation Rate applied each period; and wherein the Benefit Escalation Rate is between 0% and 10%.

18. The method of claim 16, wherein the information received pertaining to participation is obtained by monitoring the participation of the insured person.

19. The method of claim 16, wherein the usage information received includes information associated with a plurality of separate and distinct occurrences of wellness program participation by the insured person.

* * * * *